US012699931B2

(12) United States Patent  
Selz et al.

(10) Patent No.: US 12,699,931 B2  
(45) Date of Patent: Aug. 4, 2026

(54) METHOD AND SYSTEM FOR CLASSIFICATION AND/OR PREDICTION ON UNBALANCED DATASETS

(71) Applicant: Squirro AG, Zürich (CH)

(72) Inventors: Dorian Selz, Zürich (CH); Toni Birrer, Zürich (CH)

(73) Assignee: Squirro AG, Zurich (CH)

( * ) Notice: Subject to any disclaimer, the term of this patent is extended or adjusted under 35 U.S.C. 154(b) by 1136 days.

(21) Appl. No.: 17/729,085

(22) Filed: Apr. 26, 2022

(65) Prior Publication Data

US 2023/0342672 A1 Oct. 26, 2023

(51) Int. Cl.  
*G06N 20/20* (2019.01)  
*G06F 18/2431* (2023.01)

(52) U.S. Cl.  
CPC ......... *G06N 20/20* (2019.01); *G06F 18/2431* (2023.01)

(58) Field of Classification Search  
USPC .......................................................... 706/12  
See application file for complete search history.

(56) References Cited

U.S. PATENT DOCUMENTS

| | | | |
|---|---|---|---|
| 2011/0145178 A1 | 6/2011 | Schmidtler et al. | |
| 2012/0023046 A1 | 1/2012 | Verma et al. | |
| 2014/0172754 A1* | 6/2014 | He ........................... | G06N 5/02 |
| | | | 706/12 |

(Continued)

FOREIGN PATENT DOCUMENTS

| | | | | | |
|---|---|---|---|---|---|
| CN | 109119167 A | * | 1/2019 | ....... | G06F 18/24323 |
| CN | 112949738 A | * | 6/2021 | ............ | G06N 3/045 |
| CN | 113628701 A | * | 11/2021 | ........... | G06F 18/241 |

(Continued)

OTHER PUBLICATIONS

Faris et al., "Improving financial bankruptcy prediction in a highly imbalanced class distribution using oversampling and ensemble learning: a case from the Spanish market", Progress in Artificial Intelligence, vol. 9, pp. 31-53, Published Jul. 6, 2019, https://doi.org/10.1007/s13748-019-00197-9 (Year: 2019).*

(Continued)

*Primary Examiner* — Usmaan Saeed  
(74) *Attorney, Agent, or Firm* — Ziegler IP Law Group, LLC.

(57) ABSTRACT

Disclosed is a computer-implemented method for classification and/or prediction of data samples on unbalanced datasets, the method comprising: receiving unbalanced training dataset; generating at least one first model and at least one second model using unbalanced training dataset, the generation of the at least one first model comprises generating first training dataset comprising first data subset and second data subset of equal amounts of data; the generation of the at least one second model comprises generating second training dataset comprising third data subset and fourth data subset of equal amounts of data, machine learning algorithm(s) are employed for learning from the first and second training datasets; generating composite model using the first model(s) and the second model(s); employing composite model for classification and/or prediction on unbalanced test dataset for generating output, the output includes at least one classified data and/or a prediction for a data sample.

12 Claims, 4 Drawing Sheets

(56) References Cited

U.S. PATENT DOCUMENTS

| | | | | |
|---|---|---|---|---|
| 2020/0184268 A1* | 6/2020 | Lewis | .................... | G06N 20/00 |
| 2022/0344049 A1* | 10/2022 | Hall | ...................... | G06N 3/098 |

FOREIGN PATENT DOCUMENTS

| | | | | | |
|---|---|---|---|---|---|
| CN | 113362167 B | * | 8/2023 | ............. | G06Q 40/03 |
| CN | 113988458 B | * | 12/2024 | ............. | G06F 18/24 |
| CN | 114546847 B | * | 5/2025 | ....... | G06F 18/24323 |
| WO | WO-2020093718 A1 | * | 5/2020 | ............. | G06F 16/28 |

OTHER PUBLICATIONS

Wang S. Diversity Analysis on Imbalanced Data Sets by Using Ensemble Model. 2009 IEEE Symposium on Computational Intelligence and Data Mining, Mar. 30, 2009. Retrieved from internet <https://ieeexplore.ieee.org/document/4938667> (Year: 2009).*

Amazon Web Services published "Amazon Machine Learning Developer Guide—Cross-Validation" on Aug. 2, 2016, 2 pages.

Faris et al., published "Improving financial bankruptcy prediction in a highly imbalanced class distribution using oversampling and ensemble learning: a case from the Spanish market" in Progress in Artificial Intelligence in Springer on Jul. 6, 2019, 23 pages.

Al-Malaise et al. published "Students' Performance Prediction System Using Multi Agent Data Mining Technique" in International Journal of Data Mining & Knowledge Management Process (IJDKP) in vol. 4, No. 5 in Sep. 2014, 20 pages.

* cited by examiner

METHOD AND SYSTEM FOR CLASSIFICATION AND/OR PREDICTION ON UNBALANCED DATASETS

TECHNICAL FIELD

This invention relates to machine learning. In particular, though not exclusively, this invention relates to a method for generating a composite machine learning model for classification and/or prediction of data samples on unbalanced datasets and a system for generating the composite machine learning model for classification and/or prediction of data samples on the unbalanced datasets.

BACKGROUND

Machine learning is a widely used artificial intelligence technology that enables machines employing machine learning models to accurately perform tasks such as (predicting outcomes of test conditions, is classifying data into classes, and the like) without being explicitly programmed to do so. Machine learning utilizes known inputs and their corresponding outputs to train a machine learning model for learning a function relating such inputs to outputs. The trained machine learning model is then used for classification/prediction of unknown test inputs. The machine leaning utilizes machine learning algorithm to train the machine leaning model.

The data on which the machine learning model is used is commonly unevenly distributed data, where a distribution of data samples across several classes is biased or skewed. Therefore, performing machine learning tasks on such data results in biased outputs which are often incorrect. This problem arises because most machine learning algorithms used today are designed around the assumption of equal distribution of data samples across various classes. Therefore, applying conventional machine learning models to such an unbalanced dataset may give rise to a problem of overfitting or underfitting, Several conventional approaches are employed to address the problem of underfitting. Examples of such approaches include increasing model complexity, increasing number of features, performing feature engineering, removing noise from the sample data, increasing the number of epochs or increasing duration of training of the model, and the like. However, such approaches are sub optimal since they involve long processing times, high memory usage, high power usage, and the like, resulting in compromising efficiency of computing equipment on which such models are run. Similarly, several conventional approaches have been utilized to overcome the problem of over fitting. Examples of such approaches may include increasing training data, reducing model complexity, reducing training time of the model, ridge regularization, lasso regularization, using dropout for neural network, and the like. However, the aforesaid approaches of targeting the problem of overfitting are sub optimal, as some of them reduce an accuracy of learning a complex model, while the others put high computational burden on the computing equipment.

Therefore, in light of the preceding discussion, there is a need to overcome the aforementioned drawbacks associated with processing of unbalanced datasets using machine learning.

SUMMARY OF THE INVENTION

A first aspect of the invention provides a computer-implemented method for classification and/or prediction of data samples on unbalanced datasets, the method comprising:

receiving an unbalanced training dataset, wherein the unbalanced training dataset includes data that is unevenly distributed into a plurality of categories;

generating at least one first model using the unbalanced training dataset, wherein the step of generating the at least one first model comprises:

generating a first training dataset comprising a first data subset and a second data subset, wherein the first data subset includes data of one category from amongst the plurality of categories and the second data subset includes an equal amount of data from at least one remaining category from amongst the plurality of categories, an amount of data in the first data subset and an amount of data in the second data subset is similar; and employing at least one machine learning algorithm for learning from the first training dataset;

generating at least one second model using the unbalanced training dataset, wherein the step of generating the at least one second is model comprises:

generating a second training dataset comprising a third data subset and a fourth data subset, wherein the third data subset includes equal amounts of data from at least two categories from amongst the plurality of categories and the fourth data subset includes an equal amount of data from at least one remaining category from amongst the plurality of categories, and wherein an amount of data in the third data subset is equal to N times an amount of data in a category having least amount of data from amongst the at least two categories, N being a number of categories in the at least two categories, and wherein the amount of data in the third data subset and an amount of data in the fourth data subset is similar; and employing at least one machine learning algorithm for learning from the second training dataset;

generating a composite model using the at least one first model and the at least one second model; and employing the composite model for classification and/or prediction on an unbalanced test dataset for generating an output of the composite model, wherein the output is at least one classified data sample and/or a prediction for at least one data sample.

The unbalanced dataset can be defined as a dataset in which the data samples are unevenly distributed across each category. This means that different categories do not include a same amount of data samples, but rather include varying amounts of data samples. By "unbalanced" it is meant that the distribution of data samples across the plurality of categories is non-uniform and is biased or skewed. In these datasets, there is at least one majority category (i.e., a category having a high number of data samples) and at least one minority category (i.e., a category having a low number of data samples), thus resulting in skewness of data sample distribution. In an embodiment, the unbalanced dataset can be described in terms of an imbalance ratio. The imbalance ratio is defined as a ratio of number of data samples present in a category having highest amount of data samples with a category having lowest amount of data samples. For example, the imbalance ratio of 1 to 100 (or 1:100) means that for 1 data sample in a category having least amount of data samples, there are 100 data samples in a category having highest amount of data samples.

Data sample refers to a data element (i.e., a single unit of data) of a given category in the unbalanced dataset. Data sample may include various types of data elements such as but not limited to, documents, images, videos, tickets, etc. The term "data" has been used in the present disclosure to refer simply to a collection of data samples. For example, "data" of a given dataset or a given category means "a collection of data samples" in the given dataset or the given category. Likewise, "an amount of data" in the given dataset or the given category means "a number of data samples" in the given dataset or the given category.

Real-life examples of the unbalanced dataset may include transactions in the banking sector. Each transaction is a data sample of the unbalanced dataset. For instance, there can be thousands of properly authorized (i.e., genuine) transactions for each fraudulent transaction. In such a case, a category of genuine transactions would have a much higher amount of data as compared to another category of fraudulent transactions. Thus, the category of genuine transactions may be considered to be a majority category, whereas the category of fraudulent transactions may be considered to be a minority category. Another example of the unbalanced dataset may be that of diseases. The number of patients with a rare disease can be far less than the number of patients having common diseases. Yet another example of the unbalanced dataset may be that of e-mails. The e-mails may be divided into several categories, for example, primary, spam, etc. The e-mail in each category is referred to as the data sample. The number e-mails coming in primary category can be far more than the number of e-mails coming in the spam category. Yet still another example of the unbalanced dataset may be that of customer support requests on an e-commerce platform. The customer support requests may include but not limited to order placement requests, return requests, exchange requests, cancellation requests, etc.

In an embodiment, a given unbalanced dataset may be divided into several smaller datasets. For example, the given unbalanced dataset may be divided into the unbalanced training dataset and the unbalanced test dataset. In an embodiment, a predefined percentage of data samples of the given unbalanced dataset may be assigned as the unbalanced training dataset, and the rest of the data samples of the given unbalanced dataset may be assigned as the unbalanced test dataset. For example, the predefined percentage may be 70% of the unbalanced dataset. In an example, the given unbalanced dataset may include 10000 data samples. Amongst 10000 data samples, 7000 data samples may be assigned as the unbalanced training dataset and remaining 3000 data samples may be assigned as the unbalanced test dataset.

In an example, the unbalanced training dataset may include data samples belonging to nine categories. Each of the categories may have a varying number of data samples in an unbalanced manner. Let us consider, as a first example, that a category A has 183716 data samples, a category B has 135650 data samples, a category C has 66463 data samples, a category D has 13660 data samples, a category E has 6182 data samples, a category F has 2370 data samples, a category G has 1010 data samples, a category H has 615 data samples and a category I has 150 data samples. The imbalance ratio of the aforesaid unbalanced training dataset is approximately equal to 1:1200. Here, the imbalance ratio is the ratio of number of data samples present in the category A with the number of data samples present in the category I.

The unbalanced training dataset can be received from at least one data source. It should be noted that, at the data source, the unbalanced training dataset includes unevenly distributed data samples in multiple categories. The data source can be a data repository wherein at least the unbalanced training dataset is stored. The data repository serves as a filing system for storing at least the unbalanced training dataset. The data repository may be implemented as a memory of a device (such a cloud-based server, a computer, or similar), a removable memory, a cloud-based database, or similar.

According to the first aspect, the present invention provides an artificial intelligence (AI)-based computer-implemented method to classify and/or predict data samples on unbalanced test datasets using the composite model. It will be appreciated that various machine learning models may be used to generate the composite model. Notably, the composite model generated by using at least two machine learning models. The at least two machine learning models include, for example, the at least one first model and the at least one second model. In some embodiments, the composite model may be generated using a plurality of first models and a plurality of second models.

The at least one first model is generated by using the unbalanced training dataset. A given first model may be understood to be a single value model (i.e., a model which typically requires large coherent training datasets for learning). The step of generating the at least one first model includes generating the first training dataset and employing the at least one machine learning algorithm for learning from the first training dataset. The at least one machine learning algorithm is used for solving artificial intelligence (AI) problems or tasks, which. The tasks may be a classification task and/or a prediction task. Optionally, the at least one first model is generated by iteratively training a first neural network using the unbalanced training dataset. In this regard, the at least one machine learning algorithm that is employed is suited for training of neural networks. Various examples of the first neural network may include, but are not limited to, an artificial neural network (ANN), an inverting neural network (INN), a convolutional neural network (CNN), a recurrent neural network (RNN), a simulated neural network (SNN).

The first training dataset may be obtained from the unbalanced training dataset. The first training dataset may include a predefined number of data subsets that are generated and collated to constitute the first training dataset. In an embodiment, the first training dataset includes at least two data subsets, for example, the first data subset and the second data subset. In such a case, the step of generating the first training dataset comprises generating the first data subset and the second data subset and collating the first data subset and the second data subset to collectively constitute the first training dataset.

The number of data samples in the first data subset and the second data subset is selected so that an amount of data in the first data subset and an amount of data in second data subset is similar. The amount of data in any category is an amount of data samples in said category (i.e., a number of data samples in said category). The data may be automatically selected by at least one processor of a system that implements the aforesaid method.

The first data subset includes the data samples of one category from amongst the plurality of categories in the unbalanced training dataset. The category to be selected as the first data subset is changed for each of the at least one first model. For example, in one first model, data samples from category A may be selected as the first data subset, in another first model, data samples from category C may be selected as the first data subset, and so on. In some implementations, the first data subset may include an entirety of the data samples of one category, whereas in other implementations, the first data subset may include a portion of the data samples of one category. The category may be any one of the categories of the unbalanced training dataset. The second data subset may include data samples of the remaining categories of the unbalanced training dataset. For example, in the case of Y categories, the second data subset includes data samples belonging to (Y−1) categories.

The second data subset can be obtained from the unbalanced training dataset in at least two manners. In an embodiment, an equal number of data samples can be selected from each of the remaining categories to constitute the second data subset, such that a summation of such data samples is equal to the number of data samples in the first data subset. In another embodiment, the number of data samples from the remaining categories are selected in an unbalanced manner such that a summation of the selected data samples from all the remaining categories is equal to the number of data samples in the first data subset. It will be appreciated that in the second data subset, data samples from each of the minority categories (i.e., the remaining categories other than a given category) are selected.

In an embodiment, the amount of data in the first data subset and the amount of data in the second data subset may be similar when said amounts of data lie in a range of 80 percent to 125 percent of each other. For example, the first data subset set has 40000 data samples whereas the second data subset has 42000 data samples. The amount of data of the first data subset is 95 percent of the second data subset, and thus in the specified range and deemed similar. Advantageously, the technical effect of the equal amounts of data in the first data subset and the second data subset is that the at least one first model gets adequately trained for each category of the unbalanced training dataset.

The at least one first model may be generated for each category of the unbalanced training dataset. During generation of the at least one first model, the first data subset and the second data subset are changed (i.e., updated) for each first model to efficiently and accurately generate the at least one first model for every category of the unbalanced training dataset. In other words, each first model is generated by selecting different categories of the unbalanced training dataset. The one category selected for generating the first data subset changes for different first models, and thus the at least one remaining category for generating the second data subset also changes for different first models.

Referring to the first example, in one first model, the 183716 data samples of category A may be selected as the first data subset, and an equal number of data samples may be selected from the remaining categories of the unbalanced training dataset as the second data subset such that a total of data samples is equal or nearly equal to 183716. In the same manner, in another first model, the 135650 data samples of category B may be selected as the first data subset, and data samples of all the remaining categories are selected as the second data subset such that a total of data samples is equal or nearly equal to 135650, and so on. In yet another first model, 150 data samples of category I may be selected as the first data subset and 40 data samples form category A, 30 data samples from category B, 20 data samples from category C, 20 data samples from category D, 10 data samples from category E, 10 data samples from category F, 10 data samples from category G, 10 data samples from category H may be selected as the second data subset.

The aforesaid generation of the at least one first model is continued (i.e., repeated) for each category of the unbalanced training dataset. Optionally, the step of generating the at least one first model may be continued until the first training dataset becomes unviable, wherein the first training dataset becomes unviable when the amount of data in the first data subset and the amount of data in the second data subset are unequal. It will be appreciated that the number of the at least one first model can be unlimited, but depends on the first training dataset. The at least one first model is generated until the first training dataset becomes unviable. After the generation of one first model, the same process may be repeated to generate one or more first models subsequently. The generation of the at least one first model using the first training dataset can be continued till equal amounts of data in the first data subset and the second data subset is available. The generation of the at least one first model is stopped when the equal amounts of data in the first data subset and the second data subset are no longer available, for example, when the amount of data in the first data subset exceeds the second data subset or vice versa. This can be further explained with the help of a following example. Consider an unbalanced training dataset having 15 categories. A smallest category may have 10 data samples. In one first model, the 10 data samples of the smallest category may be selected as the first data subset and 1 data sample may be selected from each of the remining 14 categories as the second data subset. However, in this case, the total data samples in the second data subset accounts to 14, therefore, the amount of data in the second data subset (substantially) exceeds the amount of data in first data subset. Therefore, in such case, the one first model cannot be generated. Advantageously, the technical effect of stopping the generation of the at least one first model is that the model does not overfit for the data subset having a greater amount of data. Therefore, it subsequently helps to improve the at least one first model's performance on the unbalanced test dataset.

It will be appreciated that "unviability" of a given dataset (such as the first training dataset and/or the second training dataset) may be determined by the well-known concept of minimum viable dataset in machine learning. The given dataset may be unviable only when its minimum viable dataset cannot be generated. Several well-known approaches such as data pooling (from example, from multiple data sources), data enrichment (using, for example, other datasets), knowledge transfer (using, for example, pre-trained models, untrained models with suitable generic datasets, or similar), iterative data generation, data reuse, or similar, may be employed for generating minimum viable datasets minimum viable first training dataset and minimum viable second training dataset).

The at least one machine learning algorithm is employed for learning from the first training dataset. The at least one machine learning algorithm receives and analyses inputs and outputs in the first training dataset to infer a first learning function which maps inputs to outputs. Various machine learning algorithms can be used to process the first training dataset. In an embodiment, the at least one machine learning algorithm may include at least one of: a classification algorithm, a prediction algorithm. The classification algorithm may include, but are not limited to, a naïve bayes algorithm, a k-nearest neighbour algorithm, and a decision tree algorithm, an ensemble algorithm. The prediction algorithm may include, but are not limited to, a regression algorithm, a random forest algorithm, a gradient boosted model, a k-means algorithm, and prophet method.

Further, the second model is generated by using the unbalanced training dataset. The step of generating the at least one second model includes generating a second training dataset and employing at least one machine learning algorithm for learning from the second training dataset. The at least one machine learning algorithm are used for solving artificial intelligence (AI) problems or tasks. The tasks may be a classification task and/or a prediction task. The at least one machine learning algorithm may include at least one of: a classification algorithm, a prediction algorithm. The classification algorithm may include, but are not limited to, a naïve bayes algorithm, a k-nearest neighbour algorithm, and a decision tree algorithm, ensemble algorithm. The prediction algorithm may include, but are not limited to, a regression algorithm, a random forest algorithm, a gradient boosted model, a k-means algorithm, and prophet method. Optionally, the at least one second model is generated by iteratively training a second neural network using the unbalanced training dataset. In this regard, the at least one machine learning algorithm that is employed is suited for training of neural networks. Various examples of the second neural network may include, but are not limited to, an artificial neural network (ANN), an inverting neural network (INN), a convolutional neural network (CNN), a recurrent neural network (RNN), a simulated neural network (SNN).

The second training dataset may be obtained from the unbalanced training dataset. The second training dataset may include a predefined number of data subsets that are generated and collated to constitute the second training dataset. In an embodiment, the second training dataset includes at least two data subsets, for example, the third data subset and the fourth data subset. In such a case, the step of generating the second training dataset comprises generating the third data subset and the fourth data subset and collating the third data subset and the fourth data subset to collectively constitute the second training dataset.

The amount of data samples in the third and fourth data subsets may be selected in a way such that the amount of data in the third data subset and the amount of data in the fourth data subset is similar. The amount of data in any category is an amount of data samples in said category (i.e., a number of data samples in said category). The data may be automatically selected by at least one processor of a system that implements the aforesaid method.

In an embodiment, the third data subset includes the data samples from at least two categories from amongst the plurality of categories in the unbalanced training dataset. The categories may be any two or more of the categories of the unbalanced training dataset. The third data subset may include an equal amount of data from each category amongst the at least two categories. The third data subset may have a predefined amount of data. The predefined amount of data of the third data subset may be equal to N times the amount of data of a category amongst the at least two categories that has a least amount of data (i.e., a minimum number of data samples), wherein N is a number of categories in the at least two categories. The fourth data subset may include data samples of the remaining categories of the unbalanced training dataset other than the at least two categories. For example, in the case of X total categories wherein the third data subset includes data samples from 2 categories amongst the X categories, the fourth data subset includes data samples belonging to (X-2) categories.

The fourth data subset can be obtained from the unbalanced training dataset in at least two manners. In an embodiment, an equal number of data samples can be selected from each category corresponding to the fourth data subset such that a summation of such data samples is equal to the number of data samples in the third data subset. In another embodiment, the number of data samples from the remaining categories is selected in an unbalanced manner such that a summation of the data samples of all the remaining categories is equal to the number of data samples in the third data subset. It will be appreciated that in the fourth data subset, data samples from each of the minority categories (i.e., the remaining categories other than the at least two categories) are selected.

In an embodiment, the amount of data in the third data subset and the amount of data in the fourth data subset may be similar when said amounts of data lie in a range of 80 percent to 125 percent of each other. For example, the third data subset has 3000 data samples, and the fourth data subset has 3500 data samples. Advantageously, the technical effect of the equal amounts of data in the third data subset and the fourth data subset is that the at least one second model gets adequately trained for each category of the unbalanced training dataset, The at least one second model is generated for each category of the unbalanced training dataset. During generation of the at least one second model, the third data subset and the fourth data subset are changed (i.e., updated) for each second model to efficiently and accurately generate the at least one second model for every category of the unbalanced training dataset. In other words, each second model is generated by selecting different categories of the unbalanced training dataset. The at least two given categories for generating the third data subset change for different second models, and thus the at least one remaining category for generating the fourth data subset also changes for different second models.

Let us consider the first example of the unbalanced training dataset, in one second model, data samples from category A and category B may be selected as the third data subset, wherein 135650 data samples (i.e., equal to the number of data samples of category B) from each of the categories A and B are selected as the third data subset. The third data subset thus includes 271300 data samples. The fourth data subset may be generated by selecting an equal number of data samples from the remaining categories C-I such that a total of such data samples is equal or nearly equal to 271300. In another second model, the third data subset may include data samples from category A, category B, and category C. The fourth data subset may include data samples from the remaining categories of the unbalanced training dataset such that a total of such data samples is equal or nearly equal to the data samples in the third data subset, and so on. In this manner, the at least one second model is generated for all the categories of the unbalanced training dataset.

Optionally, the step of generating the at least one second model may be continued until the second training dataset becomes unviable, wherein the second training dataset becomes unviable when the amount of data in the third data subset and the amount of data in the fourth data subset are unequal. It will be appreciated that the number of the at least one second model can be unlimited, but depends on the second training dataset. The at least one second model is generated until the second training dataset becomes unviable. After the generation of one second model, the same process may be repeated to generate one or more second models subsequently. The generation of the at least one second model using the second training dataset can be continued (i.e., repeated) till the equal amount of data of the third data subset and the fourth data subset is available. The generation of the at least one second model is stopped when the equal amounts of data in the third data subset and the fourth data subset are no longer available. For example, such unavailability may occur when the amount of data in the third data subset exceeds the fourth data subset or vice versa. Advantageously, the technical effect of stopping the generation of the at least one second model is that the at least one second model does not overfit for the data subset having greater amount of data. Therefore, it subsequently helps to improve the at least one second model's performance on the test dataset.

The at least one machine learning algorithm is applied for learning from the second training dataset. The machine learning algorithm receives and analyzes inputs and outputs in the second training dataset to infer a second learning function which maps the inputs to the outputs. Various machine learning algorithms can be used to predict the second training dataset. Some examples of such machine learning algorithms have been provided hereinabove. In an embodiment, libraries such as but not limited to fasttext, Bird, Torch, Tensor may be used when employing machine learning algorithms.

In various embodiments of the invention, the at least one machine learning algorithm used to generate the at least one first model and the at least one second model may be similar or different. In an embodiment, the at least one machine learning algorithm is the same. In another embodiment, during generation of the at least one first model and the at least one second model, different machine algorithms may be applied.

The composite model is generated by combining the at least one first model and the at least one second model. In some embodiments, the composite model is generated by combining a plurality of first models and a plurality of second models. The composite mod& is more accurate as compared to a single model since it combines learnings of the at least one first model and the at least one second model that are generated differently using the same unbalanced training dataset. In particular, the composite model has knowledge of multiple learning functions learnt by the at least one first model and the at least one second model, which map the inputs and the outputs of the unbalanced training dataset. As a result, the composite model is well-trained in respect of all categories in the unbalanced training dataset.

The composite model may be used for classification and/or prediction on the unbalanced test dataset for generating the output of the composite model. The unbalanced test dataset may include the remaining dataset of the unbalanced training dataset that is not used for generating the at least one first model or the at least one second model, or may be a random portion of the unbalanced dataset, or may be an entirely new unbalanced dataset. The composite model accurately classifies a test data sample in the unbalanced test dataset into a given category and/or to make predictions in respect of the test data sample. For example, the composite model achieves up to approximately 95 percent accuracy when performing classification and/or prediction on the unbalanced test dataset.

The composite model is obtained by combining the at least one first model and the at least one second model. The composite model may be configured to classify the test data sample of the unbalanced test dataset by assigning a class label to the test data sample. The output of the classification performed by the composite model is the class label assigned to the test data sample.

Referring to the first example, the composite model assigns one class label from amongst the predefined class labels (i.e., A, B, C, D, E, F, G, H, and I) to a given test data sample of the unbalanced test dataset. The predefined class label for the given test data sample may be any one of the categories of the unbalanced dataset which have been utilized when generating the at least one first model and the at least one second model. The one class assigned to the given test data sample is determined based on the at least one first output (i.e., at least one class assigned to the given test data sample by the at least one first model) and the at least one second output (i.e., at least one class assigned to the given test data sample by the at least one second model).

Additionally or alternatively, the composite model may be configured to make a prediction pertaining to a test data sample. In such a case, the composite model is configured to predict an output corresponding to the test data sample, or to predict a new data sample preceding/succeeding the test data sample, or similar, based on trends of data samples of different categories that the composite model learnt during generation of the first models and the second models. The composite model may be used to predict outcomes of test data samples based on a trend of data samples learned by the first model and the second model.

In an example, the composite model may predict outcomes of incoming tickets at a bank, an e-commerce website, or similar. In another example, if the composite model learnt during training that values of data samples in class A (i.e., category A) increase linearly with an increase in values of data samples in class B (i.e., category B) according is to a given function, then given a test data sample belonging to class B, the composite model can predict a new output data sample belonging to class A using the given function.

The composite model learns from the unbalanced training dataset more accurately as compared to the conventional machine learning models, which tend to learn biased outputs from unbalanced data in the unbalanced training dataset. The unbalanced training dataset does not provide necessary information about the minority category(ies). Therefore, if the unbalanced training dataset is fed into a conventional model, the output may be biased. In many cases, the conventional model nearly always predicts correct outputs only for the majority class(-es) and not the minority class(-es). In other words, the conventional model trained with an unbalanced training dataset tends to be more sensitive towards the majority category and less sensitive to the minority category. In contrast, the composite model described herein is constituted by models which are trained in a manner that the composite model accurately learns from inputs and outputs of all the categories of the unbalanced training dataset. The composite model improves the classification and/or prediction accuracy for the unbalanced test dataset as it learns classification and/or prediction for all categories in the unbalanced training dataset. Therefore, using the composite model on the unbalanced test dataset reduces time duration required for training, model re-runs or iterations, and the like. This in turn significantly increases the efficiency of a computer system (such as the system of the present disclosure). In addition to the above, the use of the composite model eliminates the need for equalization and regularization of the unbalanced training dataset. For example, the composite model reduces the number of unknowable predictions on the unbalanced test dataset to approximately less than 1 percent.

Optionally, the step of employing the composite model for classification and/or prediction on the unbalanced test dataset comprises:

receiving the unbalanced test dataset; and using the composite model for processing the unbalanced test dataset for implementing at least one machine learning task on the unbalanced test dataset, wherein the at least one machine learning task is at least one of: a classification task, a prediction task.

The unbalanced test dataset may be received from at least one data source. The data source can be a data repository wherein at least the unbalanced test dataset is stored. The data source could also be any device (such as a smartphone, a laptop computer, a tablet computer, a cloud-based server, and the like) that is communicably coupled to the at least one processor. The composite model may be used on the unbalanced test dataset to determine the performance of the composite model by implementing the classification task and/or the prediction task. The composite model may be used to process the unbalanced test dataset to generate the output by implementing machine learning tasks, such as the classification task and the prediction task. Implementation of the classification task and the prediction task on the unbalanced test dataset is already described earlier.

Optionally, the step of using the composite model for processing the unbalanced test dataset comprises:

inputting the unbalanced test dataset to the at least one first model and the at least one second model;

employing the at least one machine learning algorithm to obtain at least one first output from the at least one first model and at least one second output from the at least one second model; and generating the output of the composite model using the at least one first output and the at least one second output, In an embodiment, when the composite model is used to implement the classification task, the at least one first output and the at least one second output is at least one class label assigned to a test data sample and a confidence of such assignment. A given first output includes a singular entity (i.e., one class label) and a given second output includes two or more entities (i.e., two or more class labels). Optionally, the output of the composite model is obtained as a result of a sequence of individual competitions which are set up along, for example, the decision tree algorithm.

The confidence of such assignment may be considered to be a probability. The confidence/probability associated with the at least one first output and the at least one second output may lie in a range of 0-1, 1-10 or in a range of 0 percent to 100 percent, or similar. It should be noted that, the value of confidence/probability associated with the at least one first output and the at least one second output depends upon a total amount of data in the first training dataset and the second training dataset. For example, larger amount of data in the first training dataset and the second training dataset, greater is the value of confidence/probability associated with the at least one first output and the at least one second output. In an example, the total data samples constituting the first training dataset and the second training dataset are 280999, the value of the confidence associated with a given first output and a given second output may be 3.82. Similarly, if the total data samples constituting the first training dataset and the second training dataset reduces to 250000, the value of the confidence associated with the given first output and the given second output may be 3.997. In the same manner, if the total data samples constituting the first training dataset and the second training dataset reduces to 150000, the value of the confidence associated with the given first output and the given second output may be 1.998.

In an embodiment, when the composite model is used to implement the prediction task, the at least one first output and the at least one second output is at least one predicted value a confidence of such prediction. The confidence of such prediction may be considered to be a probability.

Optionally, the output of the composite model is generated using the at least one first output and the at least one second output, by averaging or by taking a median of the at least one first output and the at least one second output. In this regard, generating the output of the composite model may comprise analysing the class label and/or the predicted value and by averaging or by taking a median of the confidence/probability associated with the at least one first output and the at least one second output. Optionally, a value of the output lies in a range of 0-1. Alternatively, optionally, a value of the output can lie in a range of 0 percent to 100 percent, or similar. For example, when the at least one first model assigns a class A to a test data sample with a confidence of 0.8 and the second model assigns a class A to the test data sample with a confidence of 0.9, the output of the confidence model may be that the test data sample is assigned the class A with a confidence of 0.85 (which is an average of 0.8 and 0.9).

Optionally, the computer-implemented method may further comprise assigning at least one first weight to the at least one first model and at least one second weight to the at least one second model, wherein the step of generating the output of the composite model utilizes the at least one first weight and the at least one second weight. The at least one first weight and the at least one second weight may be assigned to the at least one first model and the at least one second model, based on a learning performance of each model. Greater the learning performance of a given model, higher is the weight assigned to it. It will be appreciated that greater the weight assigned to a given model, greater is a contribution of a given output of the given model to the output of the composite model. In such a case, the given output is a weighted given output. Optionally, at least one weighted first output and at least one weighted second output are averaged to generate the output of the composite model. Advantageously, the technical effect of assigning weights to the at least one first model and the at least one second model is that the weighted average of the at least one first model and the at least one second model increases the accuracy of the composite model.

In contrast to the stacked approach, such as a stacked ensemble approach, where probability multiplications are the heart of (i.e., are used to generate the output of) the composite model, in the present invention, after creating the at least one first model and the at least one second model and thereafter generating the respective model outputs (i.e., the at least one first output and the at least one second output), the present invention applies a weighted average and/or a median approach to generate the output of the composite model using the respective model outputs.

Optionally, accuracies of the at least one first output and the at least one second output may depend on an amount of data in the first training dataset and an amount of data in the second training dataset. Optionally, the accuracies of the at least one first model and the at least one second model are directly proportional to the amount of data of the first training dataset and the second training dataset used to generate the at least one first model and the at least one second model, respectively. Lesser the amount of data of a given training dataset, lesser is an accuracy of a given model. The technical effect of this is that a required accuracy of the at least one first model and at least one second model may be achieved by altering the amounts of data of their corresponding training dataset.

A second aspect of the present invention provides a system for classification and/or prediction of data samples on unbalanced datasets, the system being communicably connected to a computer network, wherein the system comprises at least one processor configured to:

receive an unbalanced training dataset, wherein the unbalanced training dataset includes data that is unevenly distributed into a plurality of categories;

generate at least one first model using the unbalanced training dataset, wherein for generation of the at least one first model, the at least one processor is configured to:

generate a first training dataset comprising a first data subset and a second data subset, wherein the first data subset includes data of one category from amongst the plurality of categories and the second data subset includes an equal amount of data from at least one remaining category from amongst the plurality of categories, an amount of data in the first data subset and an amount of data in the second data subset is similar; and employ at least one machine learning algorithm for learning from the first training dataset;

generate at least one second model using the unbalanced training dataset, wherein for generation of the at least one second model, the at least one processor is configured to:

generate a second training dataset comprising a third data subset and a fourth data subset, wherein the third data subset includes equal amounts of data from at least two categories, from amongst the plurality of categories and the fourth data subset includes an equal amount of data from at least one remaining category from amongst the plurality of categories, and wherein an amount of data in the third data subset is equal to N times an amount of data in a category having least amount of data from amongst the at least two categories, N being a number of categories in the at least two categories, and wherein the amount of data in the third data subset and an amount of data in the fourth data subset is similar; and employ at least one machine learning algorithm for learning from the second training dataset;

generate a composite model using the at least one first model and the at least one second model; and employ the composite model for classification and/or prediction on an unbalanced test dataset to generate an output of the composite model, wherein the output is at least one classified data sample and/or a prediction for at least one data sample.

The computer network is communicatively connected to the at least one processor of the system. Examples of the computer network include the Internet, a radio-based network, and the like. The computer network may establish a communication with the system by means of at least one transmission link. The transmission link may include but not limited to wired links, wireless links, optical fibres etc. It will be appreciated that the communication of the computer network with the system enables the at least one processor to receive inputs through other network devices that are also connected to the computer network.

Throughout the present disclosure, the term "processor" relates to a computational element that is operable to respond to and process instructions. The at least one processor, in operation, implements the method for classification and/or prediction on unbalanced datasets. Furthermore, the term "processor" may refer to one or more individual processors, processing devices and various elements associated with a processing device that may be shared by other processing devices. Such processors, processing devices and elements may be arranged in various architectures for responding to and executing the steps of the method.

Optionally, when employing the composite model for classification and/or prediction on the unbalanced test dataset, the at least one processor is configured to:

receive the unbalanced test dataset; and use the composite model to process the unbalanced test dataset for implementing at least one machine learning task on the unbalanced test dataset, wherein the at least one machine learning task is at least one of: a classification task, a prediction task.

Optionally, when using the composite model to process the unbalanced test dataset, the at least one processor may be configured to:

input the unbalanced test dataset to the at least one first model and the at least one second model;

employ the at least one machine learning algorithm to obtain at least one first output from the at least one first model and at least one second output from the at least one second model; and generate the output of the composite model using the at least one first output and the at least one second output.

Optionally, the system may further comprise a data repository communicably coupled to the at least one processor, wherein the data repository is configured to store at least the unbalanced training dataset to be utilized for generation of the at least one first model and the at least one second model. In such a case, the data repository serves as a network device that is communicably coupled to the computer network. In other words, the data repository is communicably coupled to the at least one processor via the computer network. The data repository may serve as at least a data source for the at least one processor.

The term "data repository" refers to hardware, software, firmware, or a combination of these for storing a given information in an organized (namely, structured) manner, thereby, allowing for easy storage, access (namely, retrieval), updating and analysis of the given information. The data repository may be implemented as a memory of a device (such a cloud-based server, a computer, or similar), a removable memory, a cloud-based database, or similar. The data repository can be implemented as one or more storage devices. A technical effect of using the data repository is that is provides an ease of storage and access of processing inputs, as well as processing outputs.

Optionally, the data repository is configured to also store the unbalanced test dataset. Optionally, the data repository is configured to also store the at least one of the at least one first output, the at least one second output, and the output of the composite model.

A third aspect of the present invention provides a computer program product comprising a non-transitory machine-readable data storage medium having stored thereon program instructions that, when accessed by a processing device, may cause the processing device to implement the method of the first aspect.

The term "computer program product" refers to a software product comprising program instructions that are recorded on the non-transitory machine-readable data storage medium, wherein the software product is executable upon a computing hardware for implementing the aforementioned steps of the method for classification and/or prediction on unbalanced datasets.

In an embodiment, the non-transitory machine-readable date storage medium can direct a machine (such as computer, other programmable data processing apparatus, or other devices) to function in a particular manner, such that the program instructions stored in the non-transitory machine-readable data storage medium cause a series of steps to implement the function specified in a flowchart corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable program-mable read-only memory (EPROM or Flash memory), a static random access memory (SRAM), a portable compact disc read-only memory (CD-ROM), a digital versatile disk (DVD), a memory stick, a mechanically encoded device such as punch-cards or raised structures in a groove having instructions recorded thereon, or any suitable combination thereof.

Throughout the description and claims of this specifica-tion, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plu-rality as well as singularity, unless the context requires otherwise.

Preferred features of each aspect of the invention may be as described in connection with any of the other aspects. Within the scope of this application, it is expressly intended that the various aspects, embodiments, examples and alter-natives set out in the preceding paragraphs, in the claims and/or in the following description and drawings, and in particular the individual features thereof, may be taken independently or in any combination. That is, all embodi-ments and/or features of any embodiment can be combined in any way and/or combination, unless such features are incompatible.

BRIEF DESCRIPTION OF THE DRAWINGS

One or more embodiments of the invention will now be described, by way of example only, with reference to the following diagrams wherein.

DETAILED DESCRIPTION

Figure 1:
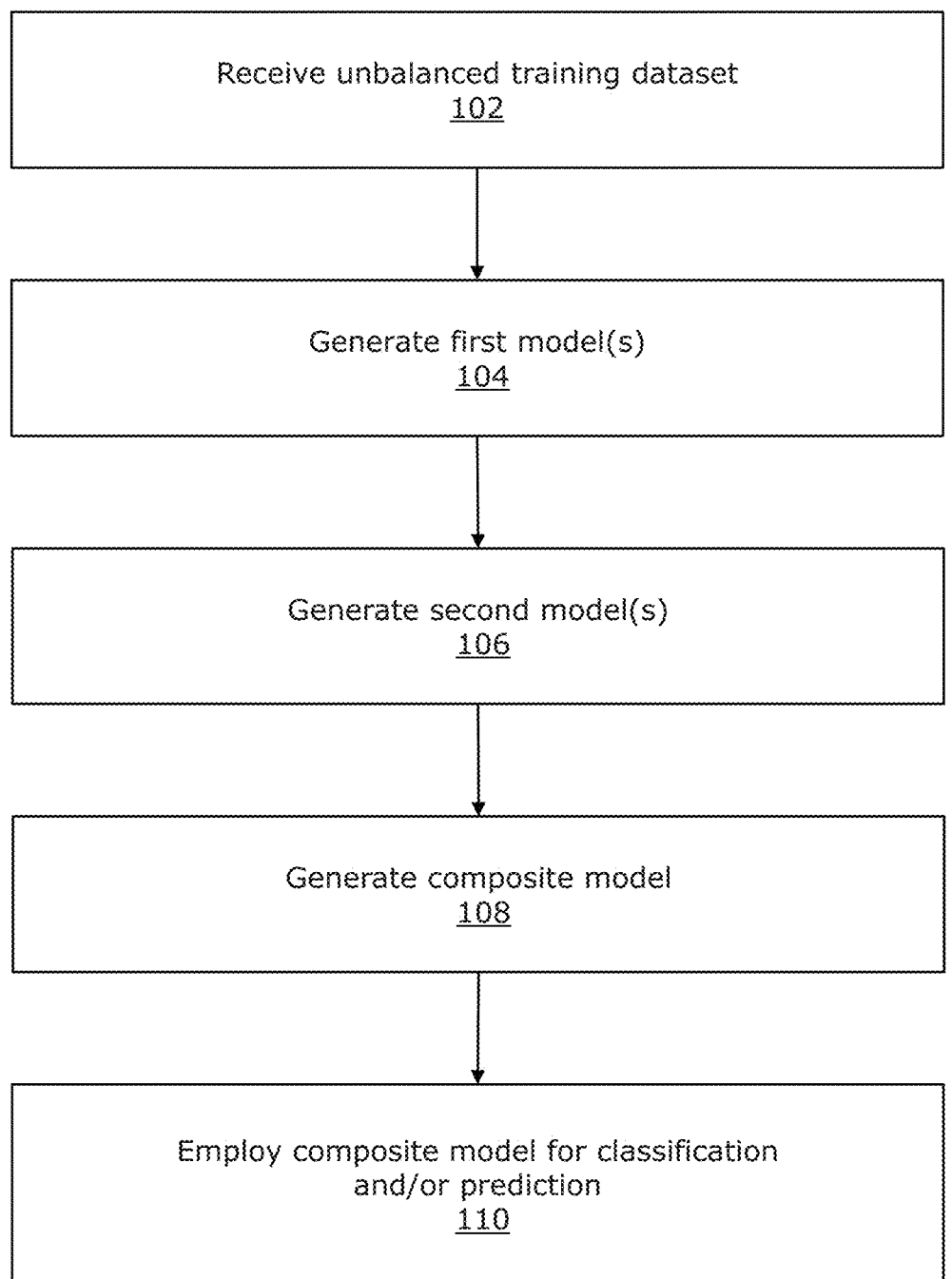
FIG. 1 is an illustration of a flowchart depicting steps of a method for classification and/or prediction of data samples on unbalanced datasets, in accordance with an embodiment of the present disclosure.

Referring to FIG. 1, illustrated is a flowchart depicting steps of a method for classification and/or prediction of data samples on unbalanced datasets, in accordance with an embodiment of the present disclosure. At step 102, the unbalanced training data is received, wherein the unbal-anced training data comprises data that is unevenly distrib-uted into a plurality of categories. At step 104, at least one first model is generated using the unbalanced training data-set. The step of generating the at least one first model comprises: generating a first training dataset comprising a first data subset and a second data subset, wherein the first data subset includes data of a one category from amongst the plurality of categories and the second data subset includes an equal amount of data from at least one remaining category from amongst the plurality of categories, an amount of data in the first data subset and an amount of data in the second data subset is similar; and employing at least one machine learning algorithm for learning from the first training data-set. At step 106, at least one second model is generated using the unbalanced training dataset. The step of generating the at least one second model comprises: generating a second training dataset comprising a third data subset and a fourth data subset, wherein the third data subset includes equal amount of data from at least two categories from amongst the plurality of categories and the fourth data subset includes equal amount of data from at least one remaining category amongst the plurality of categories, and wherein an amount of data in the third data subset is equal to N times an amount of data in a category having least amount of data from amongst the at least two categories, N being a number of categories in the at least two categories, and wherein the amount of data in the third data subset and the amount of data in the fourth data subset is similar; and employing at least one machine learning algorithm for learning from the second training dataset. At step 108, a composite model is generated using the at least one first model and the at least one second model. At step 110, the composite model is employed for classification and/or prediction on an unbal-anced test dataset for generating an output of the composite model. The output includes at least one classified data sample and/or a prediction for at least one data sample.

The aforementioned steps are only illustrative, and other alternatives can also be provided where one or more steps are added, one or more steps are removed, or one or more steps are provided in a different sequence without departing from the scope of the claims herein.

Figure 2A:
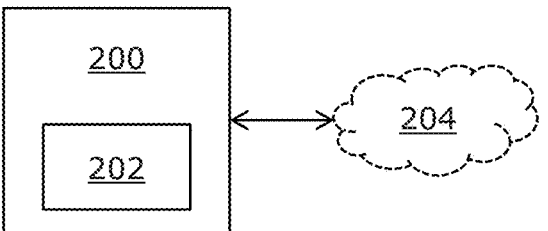
FIGS. 2A and 2B are block diagrams representing a system for classification and/or prediction of data samples on unbalanced datasets, in accordance with different embodiments of the present disclosure.

Referring to FIG. 2A, there is shown a block diagram representing a system 200 for classification and/or predic-tion of data samples on unbalanced datasets, in accordance with an embodiment of the present disclosure. The system 200 comprises at least one processor (depicted as a proces-sor 202). The system 200 is communicably connected to a computer network 204. The processor 202 is configured to execute steps of a computer-implemented method for clas-sification and/or prediction of data samples on unbalanced datasets.

Figure 2B:
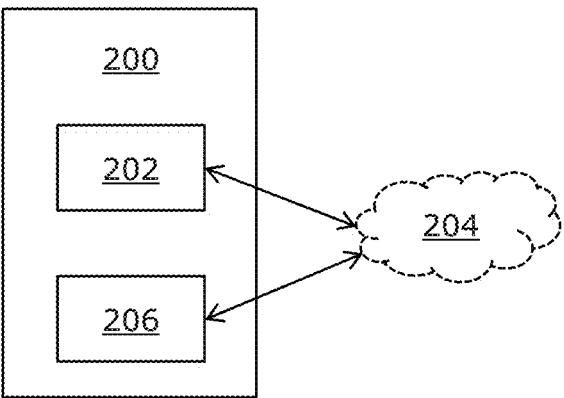

Referring to FIG. 2B, there is shown a block diagram representing a system 200 for classification and/or predic-tion of data samples on unbalanced datasets, in accordance with another embodiment of the present disclosure. The system 200 comprises at least one processor (depicted as a processor 202), and at least one data repository (depicted as a data repository 206) coupled to the processor 202. The data repository 206 is communicably connected to the processor 202 via a computer network 204. The data repository 206 is configured to store thereat at least an unbalanced training dataset to be utilized for generation of at least one first model and at least one second model.

FIGS. 2A and 2B are merely examples, which should not unduly limit the scope of the claims herein. A person skilled in the art will recognize many variations, alternatives, and modifications of embodiments of the present disclosure.

Figure 3:
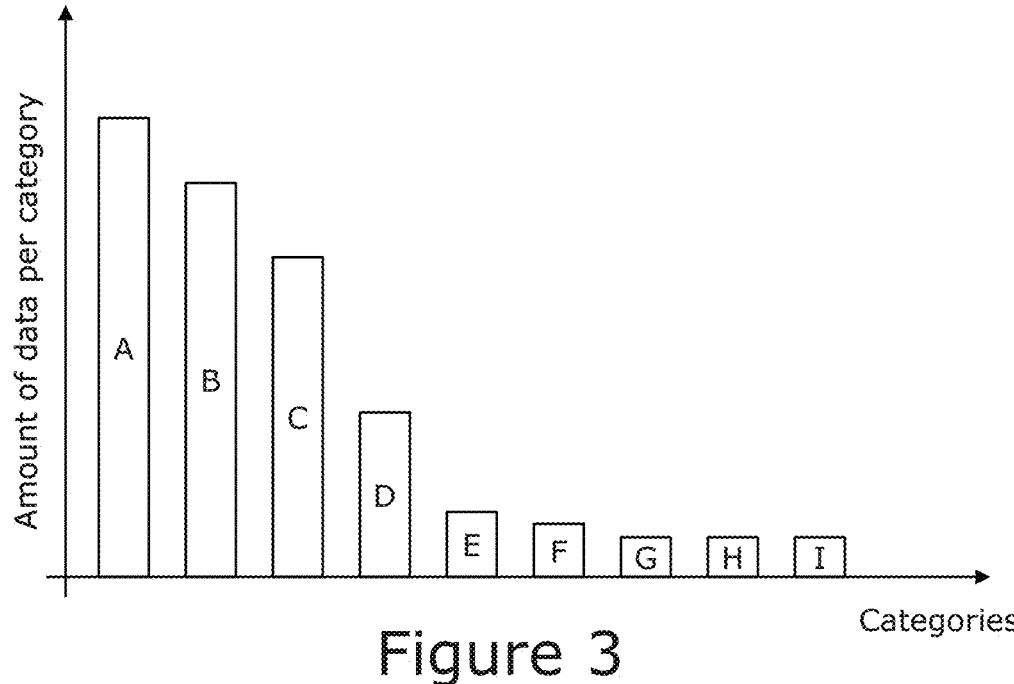
FIG. 3 is a bar graph representing an exemplary unbal-anced training dataset, in accordance with an embodiment of the present disclosure.

Referring to FIG. 3, there is shown a bar graph representing an exemplary unbalanced training dataset, in accordance with an embodiment of the present disclosure. The bar graph represents an amount of data in a plurality of categories (depicted as 9 categories A, B, C, D, E, F, G, H, and I) of the unbalanced training dataset. The amount of data in any category is an amount of data samples in said category (i.e., a number of data samples in said category). The plurality of categories are represented along a horizontal axis while the amount of data samples therein is represented along a vertical axis. The unbalanced training dataset represented herein shows that the nine categories A-I have unevenly distributed data samples. For example, the amount of data samples in categories A, B, and C is much higher than the amount of data samples in other categories.

FIG. 3 is merely an example, which should not unduly limit the scope of the claims herein. A person skilled in the art will recognize many variations, alternatives, and modifications of embodiments of the present disclosure.

Figure 4:
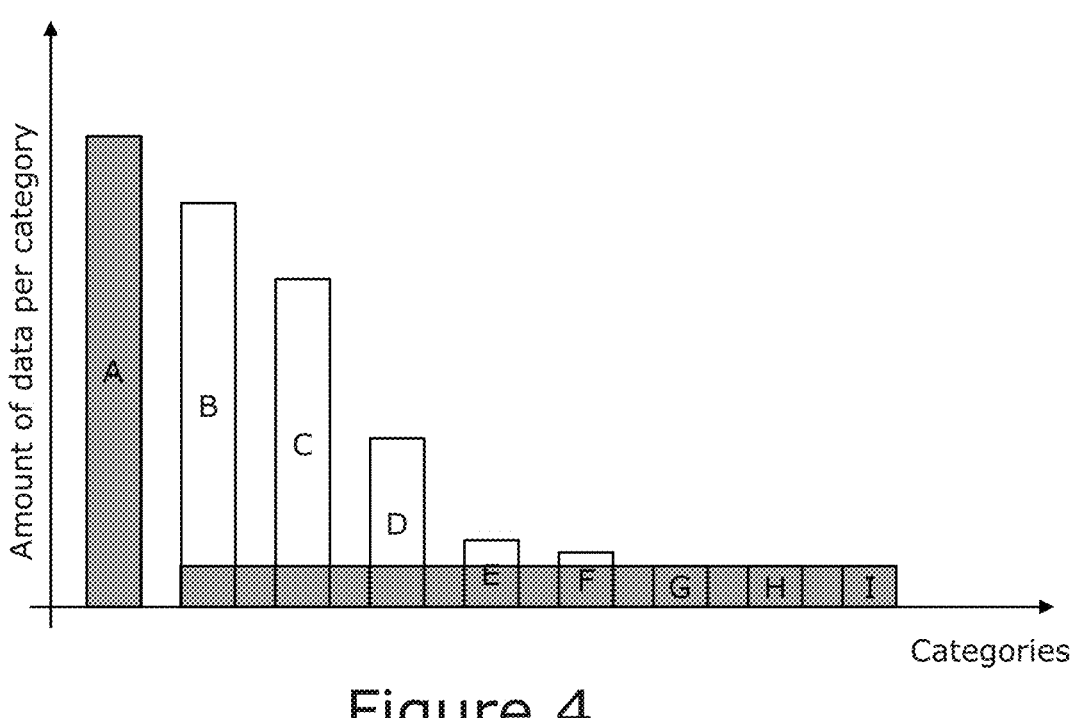
FIG. 4 is a bar graph representing an exemplary first training dataset that is created from the unbalanced training dataset of FIG. 3, in accordance with an embodiment of the present disclosure.

Referring to FIG. 4, there is shown a bar graph representing an exemplary first training dataset that is created from the unbalanced training dataset of FIG. 3, in accordance with an embodiment of the present disclosure. The shaded portions of the bar graph collectively represent an amount of data samples included in the first training dataset, in a given first model. The first training dataset comprising a first data subset and a second data subset. In the given first model, it is shown that data samples of category A are selected as the first data subset, and an equal amount of data samples are selected from each of the remaining categories B-I as the second data subset, to collectively generate the first training dataset.

FIG. 4 is merely an example, which should not unduly limit the scope of the claims herein. A person skilled in the art will recognize many variations, alternatives, and modifications of embodiments of the present disclosure. For example, in another first model, data samples of category B may be selected as the first data subset and an equal amount of data samples may selected from each of the remaining categories A, C, D, E, F, G, H and I as the second data subset, to collectively generate the first training dataset, and so on for other first models, Referring to FIG. 5, there is shown a bar graph representing an exemplary second training dataset that is created from the unbalanced training dataset of FIG. 3 for one second model, in accordance with an embodiment of the present disclosure. The shaded portions of the bar graph collectively represent an amount of data samples included in the second training dataset for the one second model. The second training dataset comprising a third data subset and a fourth data subset. In the one second model, it is shown that an equal amount of data samples from each of the category A and the category B is selected as the third data subset, and an equal amount of data samples are selected from each of the remaining categories C-I as the fourth data subset, to collectively generate the second training dataset.

Figure 6:
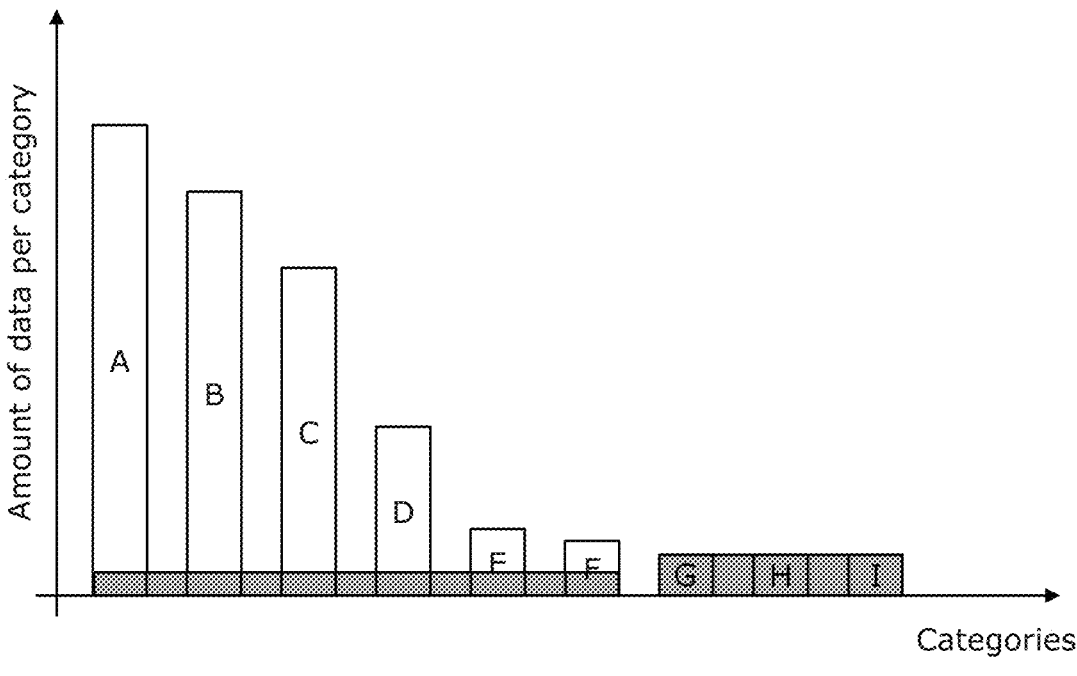
FIG. 6 is a bar graph representing an exemplary second training dataset that is created from the unbalanced training dataset of FIG. 3 for another second model, in accordance with an embodiment of the present disclosure.

Referring to FIG. 6, there is shown a bar graph representing an exemplary second training dataset that is created from the unbalanced training dataset of FIG. 3 in another second model, in accordance with an embodiment of the present disclosure. The shaded portions of the bar graph collectively represent an amount of data samples included in the second training dataset for said second model. In said second model, it is shown that an equal amount of data samples from each of the categories A-F are selected as the third data subset, and an equal amount of data samples are selected from each of the remaining categories G-I as the fourth data subset, to collectively generate the second training dataset.

Figure 7:
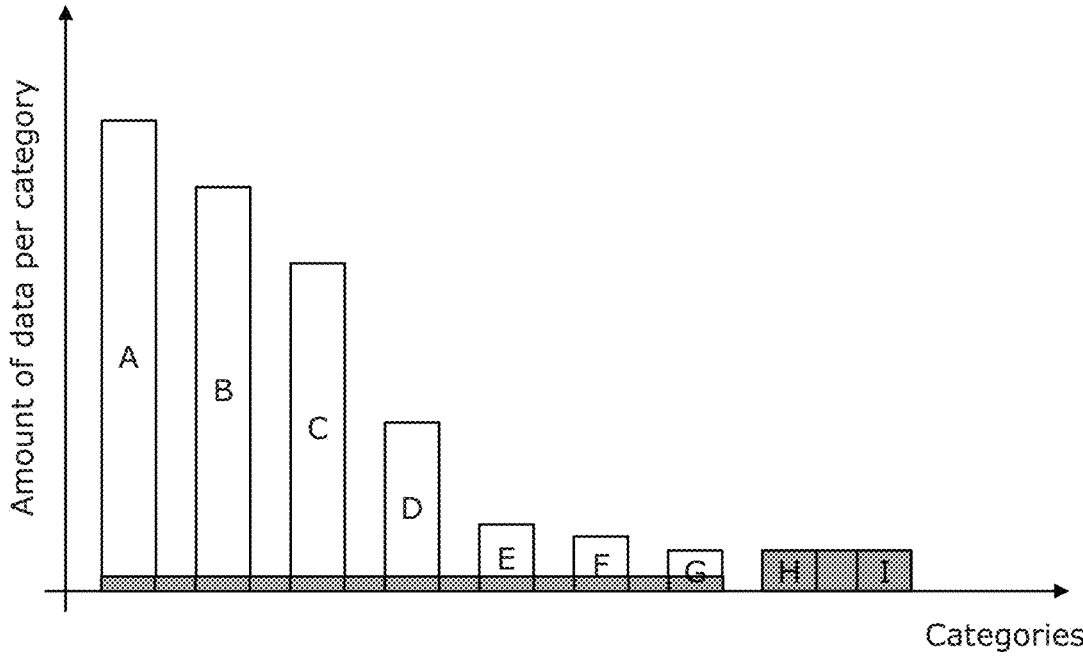
FIG. 7 is a bar graph representing an exemplary second training dataset that is created from the unbalanced training dataset of FIG. 3 for yet another second model, in accor-dance with an embodiment of the present disclosure.

Referring to FIG. 7, there is shown a bar graph representing an exemplary second training dataset that is created from the unbalanced training dataset of FIG. 3 in yet another second model, in accordance with an embodiment of the present disclosure. The shaded portions of the bar graph collectively represent an amount of data samples included in the second training dataset, in said second model. In said second model, it is shown that an equal amount of data samples from each of the categories H and I are selected as the third data subset, and an equal amount of data samples are selected from each of the remaining categories A-G as the fourth data subset, to collectively generate the second training dataset.

Figure 5:
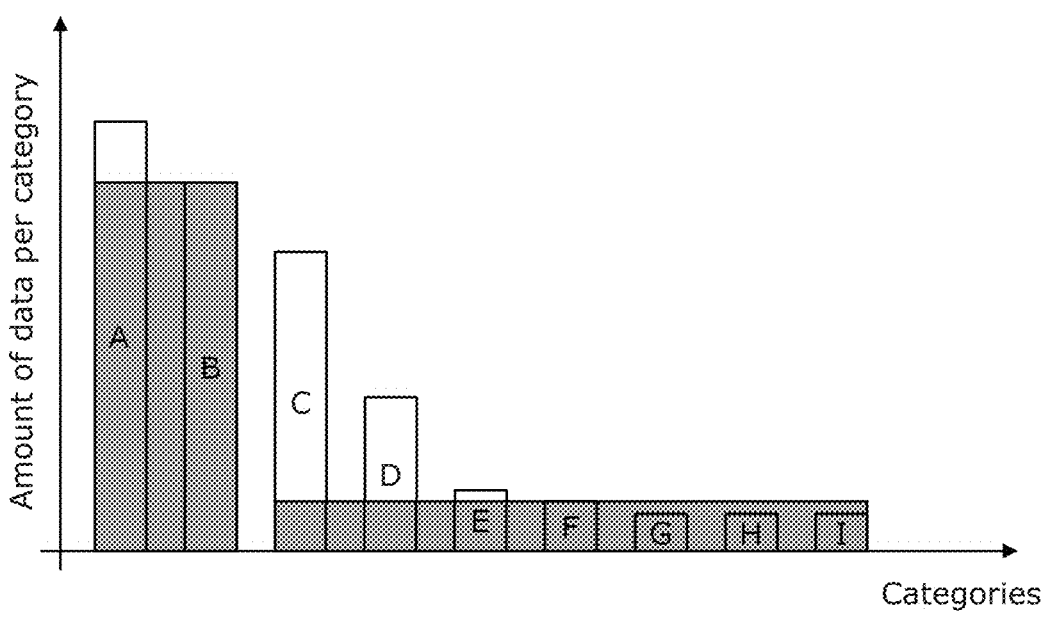
FIG. 5 is a bar graph representing an exemplary second training dataset that is created from the unbalanced training dataset of FIG. 3 for one second model, in accordance with an embodiment of the present disclosure.

FIGS. 5, 6, and 7 are merely examples, which should not unduly limit the scope of the claims herein. A person skilled in the art will recognize many variations, alternatives, and modifications of embodiments of the present disclosure. For example, in still another second model, a first equal amount of data samples from each of the categories A, B and C may be selected as the third data subset and a second equal amount of data samples may be selected from each of the remaining categories D, E, F, G, H, and I as the fourth data subset, such that the third data subset and fourth data subset have equal amounts of data, to collectively generate the second training dataset, and so on for other second models.

The FIGS. 3-7 represent some exemplary first training datasets and second training datasets used to generate the given first model and the at least one second model, respectively. In this way, the given first model and the at least one second model accurately learn classification and/or prediction with respect to every category of the unbalanced training dataset using the first training dataset and the second training dataset, respectively. Table 1 given below represents an accuracy of outputs provided by the given first model and the at least one second model as represented in FIGS. 4-7. In the Table 1, the different categories are represented via different columns.

TABLE 1

|  | A | B | C | D | E | F | G | H | I |
|---|---|---|---|---|---|---|---|---|---|
| FIG. 4 | 80% | — | — | — | — | — | — | — | — |
| FIG. 5 | 75% | 20% | — | — | — | — | — | — | — |
| FIG. 6 | 40% | 23% | 3% | 3% | 3% | 0% | 3% | 3% | 3% |
| FIG. 7 | 70% | 18% | 8% | 0% | 8% | 8% | 0% | 8% | 8% |
| Total | 66.25% | 20.3% | | | | | | | |

As depicted in FIG. 4, the given first model learns from the data samples of category A and a comparatively lesser amount of data samples from each of the remaining categories B-I. Therefore, the given first model gets highly trained for category A (as compared to other categories) and will be approximately 80% accurate for the unbalanced test dataset belonging to category A. Similarly, as depicted in FIG. 5, the second model includes a larger amount of data samples of categories A and B as compared to other categories C-I. Therefore, said second model is approximately 75% accurate for category A and approximately 20% accurate for category B. An average of such accuracies for category A is provided in the last row of the Table 1.

The invention claimed is:

1. A computer-implemented method for classification and/or prediction of data samples on unbalanced datasets, wherein at least one processor and a data repository are communicably coupled via a computer network, the method comprising:

receiving, by the computer network from the data repository, an unbalanced training dataset, wherein the unbalanced training dataset includes data that is unevenly distributed into a plurality of categories;

generating, by the processor, at least one first model using the unbalanced training dataset, wherein the step of generating the at least one first model comprises:

generating a first training dataset comprising a first data subset and a second data subset, wherein the first data subset includes data of one category from the plurality of categories and the second data subset includes data from at least one other category from the plurality of categories, wherein generating the at least one first model comprises generating an unviable first training data set, wherein the first training dataset is unviable when the amount of data in the first data subset and the amount of data in the second data subset are unequal, wherein the step of generating the at least one first model further comprises:

iteratively generating the first data subset and the second data subset; and terminating the generation of the first data subset and the second data subset when the first training dataset is the unviable first training data set; and employing at least one machine learning algorithm for learning from the first training dataset;

generating, by the processor, at least one second model using the unbalanced training dataset, wherein the step of generating the at least one second model comprises:

generating a second training dataset comprising a third data subset and a fourth data subset, wherein the third data subset includes data from at least two categories from the plurality of categories and the fourth data subset includes data from at least one other category from the plurality of categories, and wherein an amount of data in the third data subset is equal to N times an amount of data in a category having least amount of data from the at least two categories, N being a number of categories in the at least two categories, wherein generating the at least one second model comprises generating an unviable second training data set, wherein the second training dataset is unviable when the amount of data in the third data subset and the amount of data in the fourth data subset are unequal, wherein the step of generating the at least one second model further comprises:

iteratively generating the third data subset and the fourth data subset; and terminating the generation of the third data subset and the fourth data subset when the second training dataset is the unviable second training data set; and employing at least one machine learning algorithm for learning from the second training dataset;

generating, by the processor, a composite model using the at least one first model and the at least one second model; and employing the composite model for classification and/or prediction on an unbalanced test dataset for generating an output of the composite model, wherein the output is at least one classified data sample and/or a prediction for at least one data sample.

2. A computer-implemented method according to claim 1, wherein the step of employing the composite model for classification and/or prediction on the unbalanced test dataset comprises:

receiving the unbalanced test dataset; and using the composite model for processing the unbalanced test dataset for implementing at least one machine learning task on the unbalanced test dataset, wherein the at least one machine learning task is at least one of: a classification task, a prediction task.

3. A computer-implemented method according to claim 2, wherein the step of using the composite model for processing the unbalanced test dataset comprises:

inputting the unbalanced test dataset to the at least one first model and the at least one second model;

employing the at least one machine learning algorithm to obtain at least one first output from the at least one first model and at least one second output from the at least one second model; and generating the output of the composite model using the at least one first output and the at least one second output.

4. A computer-implemented method according to claim 3, further comprising assigning at least one first weight to the at least one first model and at least one second weight to the at least one second model, wherein the step of generating the output of the composite model utilises the at least one first weight and the at least one second weight.

5. A computer-implemented method according to claim 3, wherein accuracies of the at least one first output and the at least one second output depends on an amount of data in the first training dataset and an amount of data in the second training dataset.

6. A computer-implemented method of claim 1, wherein the amount of data in the first data subset and the amount of data in the second data subset is similar when said amounts of data lie in a range of 80 percent to 125 percent of each other.

7. A computer-implemented method of claim 1, wherein the amount of data in third data subset and the amount of data in the fourth data subset is similar when said amounts of data lie in a range of 80 percent to 125 percent of each other.

8. A system for classification and/or prediction of data samples on unbalanced datasets, the system being communicably connected to a computer network, wherein the system comprises at least one processor configured to:

receive, by the computer network from the data repository, an unbalanced training dataset, wherein the unbalanced training dataset includes data that is unevenly distributed into a plurality of categories;

generate at least one first model using the unbalanced training dataset, wherein for generation of the at least one first model, the at least one processor is configured to:

generate a first training dataset comprising a first data subset and a second data subset, wherein the first data subset includes data of one category from the plurality of categories and the second data subset includes data from at least one other category from the plurality of categories, wherein the processor is further configured to:

generate the at least one first model to generate an unviable first training data set, wherein the first training dataset is unviable when the amount of data in the first data subset and the amount of data in the second data subset are unequal, wherein the processor is further configured to:

iterate the generation of the first data subset and the second data subset; and terminate the generation of the first data subset and the second data subset when the first training dataset is the unviable first training data set; and employ at least one machine learning algorithm for learning from the first training dataset;

generate at least one second model using the unbalanced training dataset, wherein for generation of the at least one second model, the at least one processor is configured to:

generate a second training dataset comprising a third data subset and a fourth data subset, wherein the third data subset includes data from at least two categories, from the plurality of categories and the fourth data subset includes of data from at least one other category from the plurality of categories, and wherein an amount of data in the third data subset is equal to N times an amount of data in a category having least amount of data from the at least two categories, N being a number of categories in the at least two categories, wherein the processor is further configured to:

generate the at least one second model to generate an unviable second training data set, wherein the second training dataset is unviable when the amount of data in the third data subset and the amount of data in the fourth data subset are unequal, wherein the processor is further configured to:

iterate the generation of the third data subset and the fourth data subset; and terminate the generation of the third data subset and the fourth data subset when the second training dataset is the unviable second training data set; and employ at least one machine learning algorithm for learning from the second training dataset;

generate a composite model using the at least one first model and the at least one second model; and employ the composite model for classification and/or prediction on an unbalanced test dataset to generate an output of the composite model, wherein the output is at least one classified data sample and/or a prediction for at least one data sample.

9. A system according to claim 8, wherein when employing the composite model for classification and/or prediction on the unbalanced test dataset, the at least one processor is configured to:

receive the unbalanced test dataset; and use the composite model to process the unbalanced test dataset for implementing at least one machine learning task on the unbalanced test dataset, wherein the at least one machine learning task is at least one of: a classification task, a prediction task.

10. A system according to claim 9, wherein when using the composite model to process the unbalanced test dataset, the at least one processor is configured to:

input the unbalanced test dataset to the at least one first model and the at least one second model;

employ the at least one machine learning algorithm to obtain at least one first output from the at least one first model and at least one second output from the at least one second model; and generate the output of the composite model using the at least one first output and at least one the second output.

11. A system according to claim 8, further comprising a data repository communicably coupled to the at least one processor, wherein the data repository is configured to store thereat at least the unbalanced training dataset to be utilized for generation of the at least one first model and the at least one second model.

12. A computer program product comprising a non-transitory machine-readable data storage medium having stored thereon program instructions that, when accessed by a processing device, cause the processing device to implement the method of claim 1.

\* \* \* \* \*